United States Patent [19]

Lermite et al.

[11] Patent Number: 5,501,776
[45] Date of Patent: Mar. 26, 1996

[54] PROCESS FOR THE REGENERATION OF A DESICCANT

[75] Inventors: Christophe Lermite, Paris; Jean-Claude Amande, Villepreux; Bernard Chambon, Acheres; Joseph Larue, Chambourcy, all of France

[73] Assignees: Institut Francais Du Petrole; Nouvelles Applications Technologiques (Nat.), both of Rueil Malmaison, France

[21] Appl. No.: 154,406

[22] Filed: Nov. 19, 1993

[30] Foreign Application Priority Data

Nov. 19, 1992 [FR] France ................... 92 14020

[51] Int. Cl.$^6$ ................................................ B01D 3/34
[52] U.S. Cl. .................. 203/18; 95/187; 203/68; 203/69; 203/73; 203/80; 203/DIG. 9; 568/868; 568/916; 159/DIG. 33; 159/47.1
[58] Field of Search ................ 203/18, 73, 69, 203/25, 1, 27, 49, 68, DIG. 9, DIG. 8, 78, 80; 202/204; 568/916, 868; 95/187, 193, 254; 156/DIG. 33, 47.1

[56] References Cited

U.S. PATENT DOCUMENTS

| | | | |
|---|---|---|---|
| 1,911,829 | 5/1933 | Lebo | 203/18 |
| 2,048,178 | 7/1936 | Carney | 203/18 |
| 2,750,331 | 6/1956 | Meyers | 203/18 |
| 3,349,544 | 10/1967 | Arnold et al. | 203/18 |
| 3,370,636 | 2/1968 | Francis, Jr. et al. | 159/16.3 |
| 3,397,731 | 8/1968 | Gravis, III et al. | 203/18 |
| 3,471,370 | 10/1969 | Jubin, Jr. | 203/49 |
| 3,975,229 | 8/1976 | Jackson | 159/31 |
| 4,009,083 | 2/1977 | Lyon et al. | 203/49 |
| 4,014,667 | 3/1977 | Barber | 203/25 |
| 4,021,311 | 5/1977 | Becker | 203/69 |
| 4,314,891 | 2/1982 | Knobel | 263/49 |
| 4,349,416 | 9/1982 | Brandt et al. | 203/25 |
| 4,366,032 | 12/1982 | Mikitenko et al. | 203/18 |
| 5,035,776 | 7/1991 | Knapp et al. | 203/19 |

FOREIGN PATENT DOCUMENTS

| | | | |
|---|---|---|---|
| 0114469 | 8/1984 | European Pat. Off. | |
| 2046050 | 3/1974 | Germany | |
| 0166205 | 9/1984 | Japan | 203/18 |
| 1588339 | 4/1981 | United Kingdom | |

*Primary Examiner*—Virginia Manoharan
*Attorney, Agent, or Firm*—Millen, White, Zelano, & Branigan

[57] ABSTRACT

For the regeneration of a liquid desiccant, a stripping agent is used which is liquid at ambient temperature and pressure, and forms a heteroazeotrope with water, along with the following steps: (a) distillation of the water-laden liquid desiccant to form vapor and partially regenerated liquid desiccant; (b) reboil partially regenerated liquid desiccant; (c) stripping of partially regenerated liquid desiccant during (a) and (b), using vaporized stripping agent; (d) a condensing of vapor the exiting the distillation, the condensation producing two liquid phases, one mainly water and the other mainly stripping agent; (e) heating the stripping agent-rich liquid phase exiting step (d) to generate a vapor phase which is richer in water than said liquid phase and a water-depleted liquid phase; and (f) returning the vaporized liquid phase exiting step (e) to step (c).

19 Claims, 4 Drawing Sheets

PROCESS FOR THE REGENERATION OF A DESICCANT

BACKGROUND OF THE INVENTION

Gaseous streams, for example natural or refined gas, are usually dehydrated to control, inter alia, the water dew point of the gaseous stream and avoid hydrate or ice formation.

To dehydrate it, the gas is usually placed in contact with a hydrophilic liquid desiccant, among the most popular being chemicals of the glycol family. Triethylene glycol (TEG) is the most widely used, but monoethylene glycol (MEG), diethylene glycol (DEG) or tetraethylene glycol (T4EG) may also be used. The water-laden desiccant is then transported to a thermal regeneration apparatus in which most of the water absorbed by the desiccant is vaporized and eliminated.

However, it is well known that it is not possible to separate the water completely from the desiccant using a thermal technique at atmospheric pressure, since the desiccant degrades at a temperature below the normal boiling point. TEG, for example, boils at 285° C., but the regeneration temperature is normally limited to 204° C. The purity of regenerated TEG is then about 99% by weight.

For greater purity, one conventional method consists in following the thermal reconcentration step with a stripping step using a dry or low water content gas, for example a portion of the gaseous stream dehydrated by the desiccant. This type of process, described in detail in United States patent U.S. Pat. No. 3,105,748, produces a purity of about 99.9% by weight of the regenerated desiccant.

However, apart from generally resulting in a dry loss, one problem in using gas as a stripping agent is that it prevents condensation of hydrocarbons and other heavy substances absorbed by the desiccant during the dehydration step and vaporized at the same time as the water during reboiling and stripping. In particular, aromatics thus liberated cannot be recondensed and are flared or evacuated unchanged into the atmosphere.

To overcome these drawbacks, the stripping gas may be replaced by a circuit containing a condensable agent, normally a hydrocarbon or mixture of hydrocarbons. In this type of process, described in detail in United States patent U.S. Pat. No. 3,471,370, the stripping agent is recovered after condensation at the head of the thermal concentration stage and separation of the water condensed therewith.

When very high purity of regenerated desiccant is required, for example greater than 99.99% by weight for TEG, a stripping agent which is itself very dry must be employed. If, for example, the stripping agent forms part of the dehydrated gaseous stream, it has been suggested that the water content of this gas can be further reduced by contacting it with a portion of the high purity regenerated desiccant, said portion then being returned to the stripping stage. This type of process is described in detail in United States patent U.S. Pat. No. 3,867,112. If a condensable stripping agent is used, dehydration under pressure of this agent by various means has been proposed.

SUMMARY OF THE INVENTION

The discovery that it is possible to regenerate the dessicating agent to a very high level of purity and limit emission of heavy hydrocarbons in economic fashion by employing a condensable stripping agent and dehydrating it in novel fashion forms the object of the present invention.

Generally, a liquid desiccant regeneration process using a stripping agent in accordance with the invention is characterized in that:

i)- the stripping agent is liquid at ambient temperature and pressure, and forms a heteroazeotrope with water;

ii)- the process comprises the following steps:

(a) a distillation step comprising at least one rectification step for the water-laden liquid desiccant to form vapor and partially regenerated liquid;

(b) a reboil step for the partially regenerated liquid desiccant, (c) a stripping step carried out on the partially regenerated liquid desiccant during steps (a) and (b), using the vaporized stripping agent;

(d) a condensation step for the vapor exiting distillation step (a), the condensation producing two liquid phases, one mainly water and the other mainly stripping agent;

(e) heating the stripping agent-rich liquid phase exiting step (d) to generate a vapor phase which is richer in water than said liquid phase and a water-depleted liquid phase; and (f) returning the liquid phase exiting step (e) to step (c).

One of the principal objects of the present invention is constituted by the discovery that heating the water-saturated liquid stripping agent exiting condensation step (d) substantially reduces the residual quantity of water in the stripping agent at low energy cost, even when the boiling point of the stripping agent is lower than that of water. This is achieved by exploiting the heteroazeotrope between water and the stripping agent.

The inventive process is thus particularly suitable when it is necessary to regenerate the desiccant to a very high purity, requiring the use of a stripping agent which is itself almost anhydrous, and also when it is undesirable to lose noncondensable stripping agent either for economic reasons or to limit emission into the atmosphere of higher hydrocarbons or other substances of comparable volatility.

Steps (a) and (c) of the inventive process may be carried out successively in separate apparatus or simultaneously in the same apparatus.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE FIGURES

Figure 1:
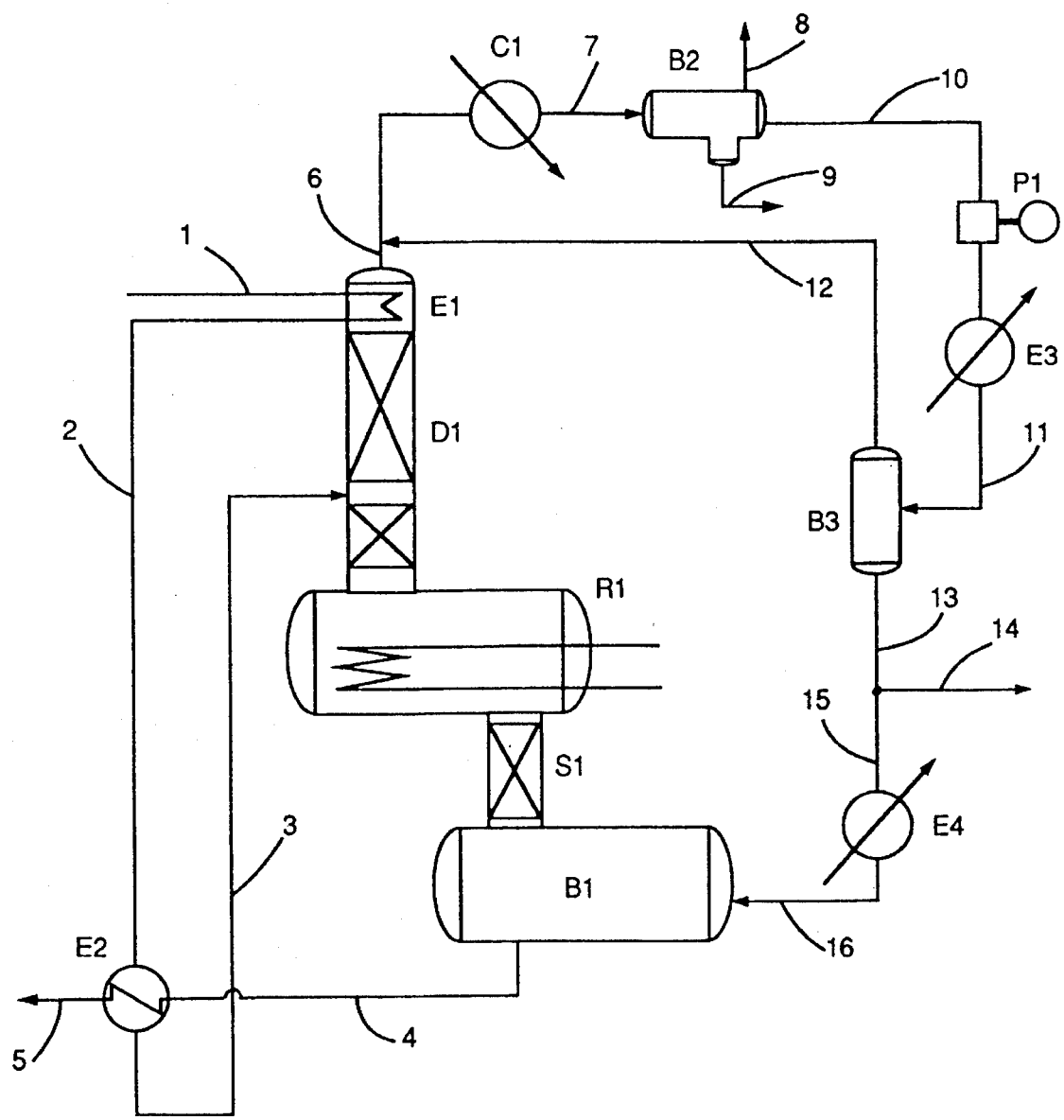
FIGS. 1, 2 and 4 are schematic flow sheets of preferred comprehensive embodiments of the invention, wherein the distillation and stripping steps are conducted in series.

One specific embodiment of the inventive process will now be described in further detail with reference to FIG. 1. In this embodiment, the vapor phase generated during step (e) may be returned upstream of step (d) and the water-depleted liquid phase exiting step (e) is vaporized before being returned to step (b) or step (c).

The charge to be treated arrives via conduit 1 at exchanger E1 positioned at the head of distillation apparatus D1; from here it is carried by conduit 2 to exchanger E2 where it is heated by regenerated liquid desiccant entering from conduit 4. The charge exits exchanger E2 via conduit 3 and enters distillation apparatus D1 which is mounted over, in descending order, a reboil zone R1, a stripping zone S1 and a reservoir B1.

The temperature in reboil zone R1 is normally between 150° C. and 250° C.

The absolute pressure in the assembly constituted by distillation apparatus D1, reboiler R1, stripping zone S1 and reservoir B1 is normally between 0.5 and 2 bar.

The majority of the water and substances lighter than the dessicating agent absorbed thereby are vaporized in reboiler R1. The water-depleted liquid desiccant falls under gravity from reboiler R1 into stripping zone S1 where it is brought into contact with a counter-current of dehydrated stripping agent entering reservoir B1 via conduit 16.

The regenerated liquid desiccant exits reservoir B1 by conduit 4, traverses exchanger E2 where it is cooled by the charge entering by conduit 2, and leaves the process via conduit 5.

Water, stripping agent and other substances vaporized in reboiler R1 leave distillation apparatus D1 through exchanger E1 by conduit 6 and are mixed, if necessary, with vapor arriving from phase separator B3 via conduit 12 then cooled in condenser C1, exiting via conduit 7 to enter decenter B2.

From here, the lightest compounds are evacuated from the process in gaseous form via conduit 8; water is evacuated from the process via conduit 9 along with other hydrophilic substances; stripping agent and other hydrophobic substances, which are saturated with water, are carried via conduit 10 through pump P1 to exchanger E3 where they are partially vaporized and carried via conduit 11 to phase separator B3.

In general, the vapor phase generated in exchanger E3, which is more water-rich than the liquid arriving via conduit 10, can be evacuated from the process. However, it is more advantageous to return it via conduit 12 to a point upstream of condenser C1 with the vapor exiting distillation apparatus D1 by conduit 6.

The liquid phase exiting phase separator B3 via conduit 13, which is depleted in water compared with the liquid entering via conduit 10, is split so as to maintain a constant flowrate of stripping agent in the circuit loop: a fixed portion is carried to evaporator E4 via conduit 15; any excess, due to absorption by the dessicating agent of part of the gaseous stream treated during the dehydration step (not shown in the figure), is evacuated from the process via conduit 14.

The vapor phase exiting evaporator E4 via conduit 16 is carried to reservoir B1.

Figure 2:
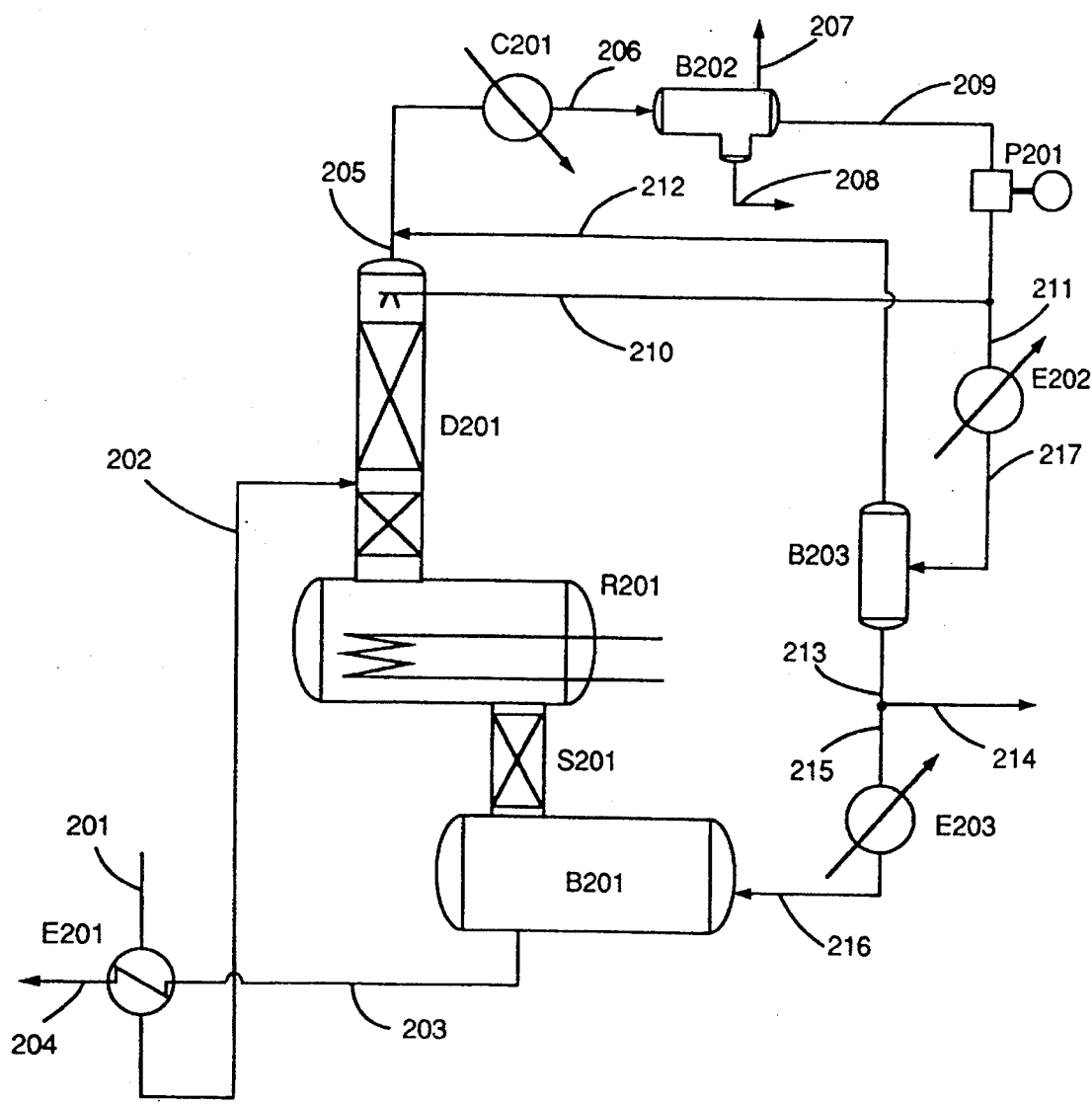

A second embodiment of the inventive process will now be described with reference to FIG. 2.

In this embodiment, a portion of the stripping agent rich separated after step (d) is brought into contact with a counter-current of vapor in step (a).

The charge to be treated enters exchanger E201 via conduit 201 where it is reheated by the regenerated liquid desiccant entering via conduit 203. The heated charge exits exchanger E201 via conduit 202 and enters distillation apparatus D201 which is mounted over, in descending order, reboil zone R201, stripping zone S201 and reservoir B201.

Vapor rising from reboil zone R201 is brought into contact in distillation apparatus D201 with a counter-current of a liquid phase mainly composed of stripping agent arriving via conduit 210.

The temperature in reboil zone R201 is normally between 150° C. and 250° C.

The absolute pressure in the assembly constituted by distillation apparatus D201, reboiler R201, stripping zone S201 and reservoir B201 is normally between 0.5 and 2 bar.

In reboiler R201 the majority of the water and substances lighter than the dessicating agent and absorbed thereby are vaporized. The water-depleted liquid desiccant falls under gravity from reboiler R201 into stripping zone S201 where it comes into contact with a counter-current of dehydrated stripping agent entering reservoir B201 via conduit 216.

Regenerated liquid desiccant exits reservoir B201 via conduit 203, travels through exchanger E201 where it is cooled by the charge arriving via conduit 201, and is evacuated from the process via conduit 204.

Water, stripping agent and other substances vaporized in reboiler R201 leave distillation apparatus D201 via conduit 205 and are mixed if necessary with vapor arriving from phase separator B203 via conduit 212, then cooled in condenser C201 from which they are carried via conduit 206 to decanter B202.

From here, the lightest compounds are evacuated from the process in gaseous form via conduit 207; the water is evacuated from the process via conduit 208 along with other hydrophilic substances; stripping agent and other hydrophobic substances, saturated with water, are carried via conduit 209 through pump P201, in part via conduit 211 to exchanger E202, and in part via conduit 210 to distillation zone D201 where it comes into contact with a counter-current of vapor rising from reboil zone R201 through distillation zone D201. The first portion is partially vaporized in exchanger E202 and carried via conduit 217 to phase separator B203.

In general, the vapor phase generated in exchanger E202, which is more water-rich than the liquid arriving via conduit 211, can be evacuated from the process. However, it is more advantageous to return it via conduit 212 to a position upstream of condenser C201 with the vapor leaving distillation apparatus D201 via conduit 205.

The liquid phase leaving phase separator B203 via conduit 213, which is depleted in water compared with the liquid arriving via conduit 211, is split so as to maintain a constant flowrate of stripping agent in the circuit: a fixed portion is returned to evaporator E203 via conduit 215; any excess, resulting from absorption by the dessicating agent of part of the gaseous stream treated during the dehydration step (not shown in the figure), is evacuated from the process via conduit 214.

The vapor phase exiting evaporator E203 is carried to reservoir B201 via conduit 216.

Other configurations may be employed for the process according to the invention; evaporator E4 in FIG. 1 (E203 in FIG. 2) may for example be dispensed with and stripping agent introduced in liquid form into reservoir B1 in FIG. 1 (B201 in FIG. 2), where it would be evaporated by direct contact with the liquid desiccant at high temperature.

Figure 3:
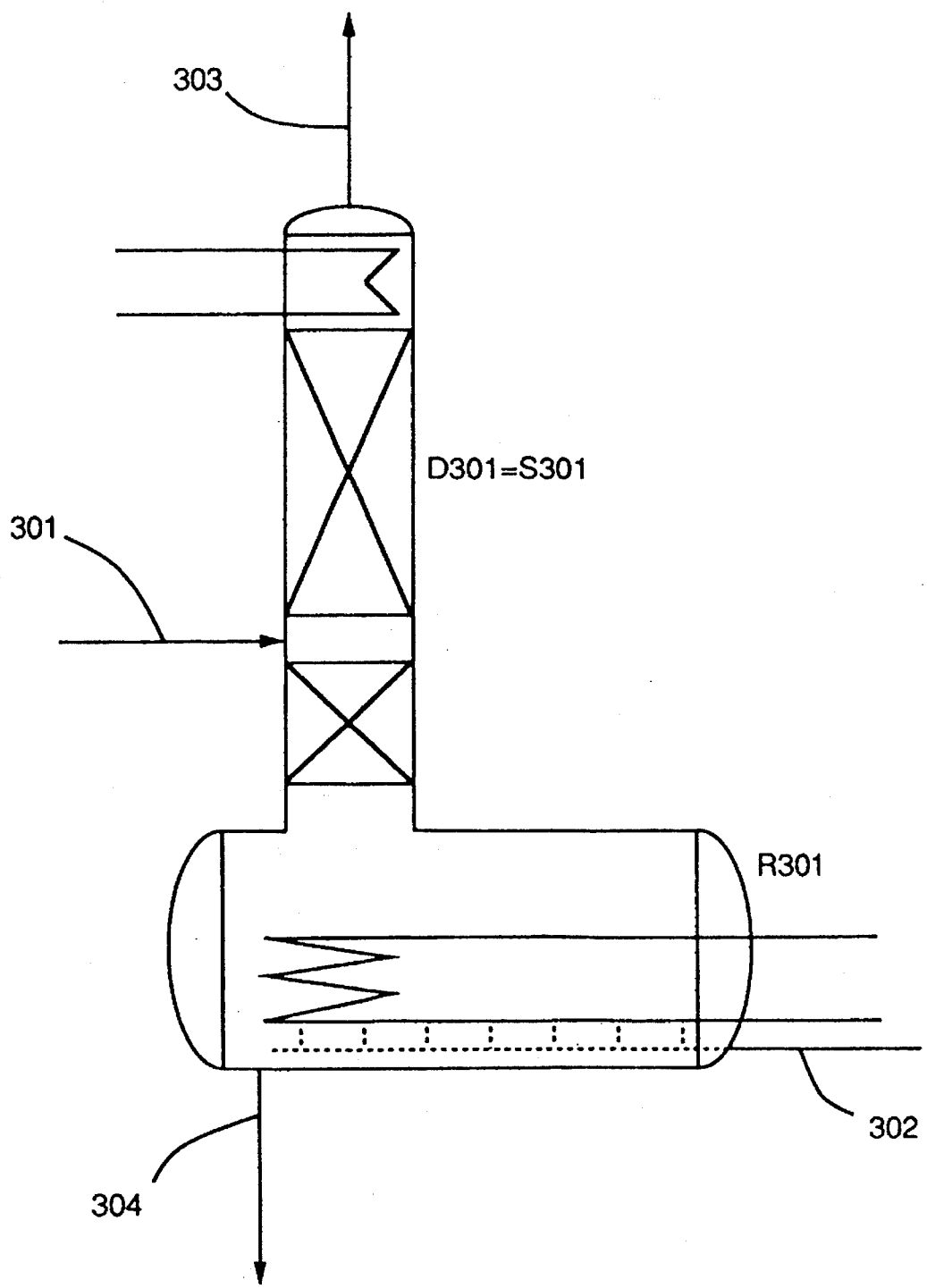
FIG. 3 is a partial flow sheet wherein the distillation and stripping steps are conducted simultaneously.

A further modification of the inventive process consists in carrying out the distillation and stripping steps simultaneously as shown in FIG. 3: the charge arrives via conduit 301 and the stripping agent, which may or may not have been previously vaporized, is introduced directly into reboiler R301 via conduit 302. Distillation apparatus D301 and stripping zone S301 are thus combined. Regenerated desiccant exits the reboiler via conduit 304 while the vapor exits distillation apparatus D301 via conduit 303.

Figure 4:
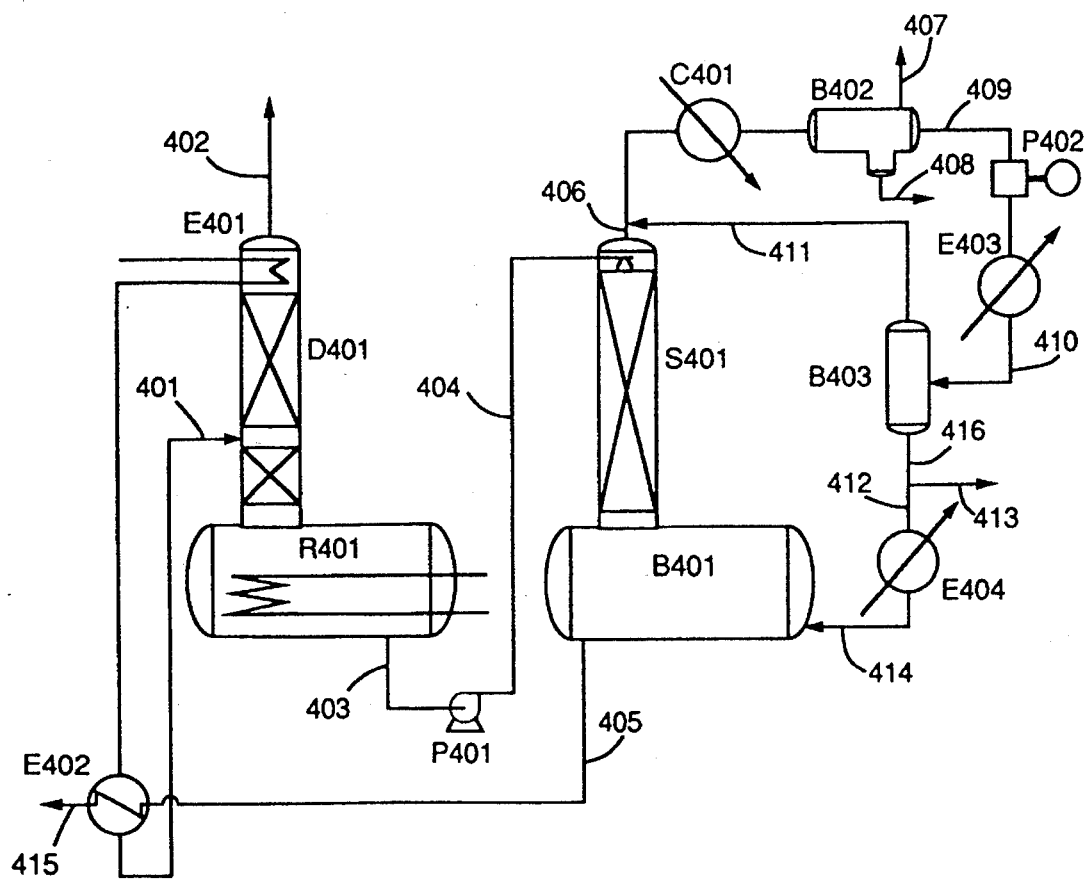

A further variation of the inventive process consists in carrying out the distillation, reboiling, stripping and condensation steps as indicated in FIG. 4: after passing through exchangers E401 and E402, the charge is introduced into distillation apparatus D401 via conduit 401 and falls by gravity into reboiler R401. The vapor phase generated in reboiler R401 rises into the distillation apparatus D401 and leaves this apparatus via conduit 402. The partially regenerated desiccant is pumped from reboiler R401 through pump P401 and via conduits 403 and 404 to stripping zone S401 which is mounted over reservoir B401. Regenerated desiccant leaves reservoir B401 via conduit 405, heats the charge in exchanger E402 and is evacuated from the process via conduit 415. Stripping agent and stripped water leave stripping zone S401 via conduit 406 and are mixed if necessary with vapor carried via conduit 411 from phase separator B403, then cooled in condenser C401 and separated in decanter B402, from which light compounds exit in vapor form via conduit 407, water and other hydrophilic substances which may be present are evacuated via conduit 408, and stripping agent and other hydrophobic substances which may be present are carried via conduit 409 through pump P402 to exchanger E403 where a water-rich vapor phase V1 and a water-depleted liquid phase L1 are generated. Phases V1 and L1 are carried via conduit 410 to phase separator B403; vapor phase V1 leaves via conduit 411 and is mixed with the vapor leaving stripping zone S401 via conduit 406; liquid phase L1 leaves phase separator B403 via conduit 416 and is divided into a surplus portion evacuated from the process via conduit 413 and a fixed portion carried by conduit 412 to evaporator E404, where it is vaporized and introduced into balloon reservoir B401 via conduit 414. A still further solution consists in reinjecting the stripping agent and stripped water leaving S401 via 406 into reboiler R401, and condensing and separating them downstream of distillation apparatus D401 as shown in the preceding schemes (FIGS. 1 to 3).

The inventive process may, for example, be applied to regeneration of a desiccant from the glycol family such as monoethylene glycol (MEG), diethylene glycol (DEG), triethylene glycol (TEG) or tetraethylene glycol (T4EG); said desiccant may, for example, be used to dehydrate a natural or refined gas.

The stripping agent may, for example, be a hydrocarbon or mixture of hydrocarbons, and may in this case contain a significant proportion of aromatic compounds, in particular benzene.

A particularly appropriate application is where the desiccant absorbs natural substances which are compatible with the stripping agent as defined in the present invention from the effluent to be dehydrated. The process then has a surplus of stripping agent which not only removes the need for any additions but may also be a profit source.

These applications are not limiting and the inventive process may be applied to regeneration of any liquid desiccant, regardless of the nature of the dehydrated effluent.

The following example illustrates the invention.

EXAMPLE

This example used the scheme represented in FIG. 1. The effluent to be treated, triethylene glycol (TEG), which had been used to dehydrate a benzene-rich natural gas, entered via conduit 1 at a temperature of 41° C., pressure of 1.2 bar and a flowrate of 3472 kg/h with the following composition by weight:

| TEG | 94.99% | Benzene | 1.67% |
|---|---|---|---|
| Water | 3.17% | Other hydrocarbons | 0.17% |

The charge entered exchanger E1, power 12.5 kW and, left via conduit 2 at a temperature of 46° C., returned to exchanger E2, power 259 kW, where it was heated to a temperature of 146° C. by regenerated TEG coming from reservoir B1 via conduit 4. The charge left exchanger E2 and was introduced via conduit 3 into distillation apparatus D1 which was mounted over, in descending order, reboiler R1, power 177 kW, in which the temperature was 204° C., stripping zone S1 and reservoir B1 in which the partially regenerated TEG was brought into contact with a countercurrent of stripping agent which arrived in vapor form via conduit 16. The pressure in distillation apparatus D1 and reboiler R1 was 1.1 bar; the pressure in stripping zone S1 and reservoir B1 was 1.2 bar. Regenerated TEG left reservoir B1 via conduit 4 at a temperature of 194° C., heated the charge arriving in exchanger E2 via conduit 2, and was evacuated from the process via conduit 5 at a flowrate of 3330 kg/h and temperature of 84° C. The composition by weight was as follows:

| TEG | 98.95% |
|---|---|
| Water | 33 ppm |
| Benzene | 1.03% |
| Other hydrocarbons | 144 ppm |

Water and stripping agent left distillation apparatus D1 in vapor form via conduit 6 at a flowrate of 662 kg/h and temperature of 114° C. The composition by weight of this stream was as follows:

| Water | 16.63% |
|---|---|
| Benzene | 79.39% |
| Other hydrocarbons | 3.68% |
| TEG | 0.30% |

This stream was then mixed with vapor arriving from phase separator B3 via conduit 12 at a flowrate of 163 kg/h and temperature of 80° C., whose composition by weight was as follows:

| Water | 0.57% |
|---|---|
| Benzene | 85.23% |
| Other hydrocarbons | 14.20% |

The mixture was cooled in condenser C1, power 175 kW, to a temperature of 40° C. and pressure of 1 bar and carried via conduit 7 to decanter B2 from which emerged three streams:

gaseous light hydrocarbons evacuated from the process via conduit 8 at a flowrate of 8.7 kg/h, having the following composition by weight:

| Water | 3.08% | Propane | 14.59% |
|---|---|---|---|
| Benzene | 42.00% | Butanes | 9.21% |
| Methane | 7.40% | Pentanes | 5.84% |
| Ethane | 15.49% | Hexanes | 2.39% | the aqueous phase evacuated from the process via conduit 9 at a flowrate of 112 kg/h, the composition by weight of this stream being as follows:

| | |
|---|---|
| Water | 98.05% |
| Benzene | 0.19% |
| TEG | 1.76% | liquid stripping agent carried via conduit 10 through pump P1 to exchanger E3, power 34 kW, at a flowrate of 704 kg/h, the composition by weight of this stream being as follows:

| | |
|---|---|
| Water | 0.15% |
| Benzene | 93.73% |
| Other hydrocarbons | 6.12% |

The partially vaporized stripping agent left exchanger E3 at a temperature of 80° C. and pressure of 1.2 bar, and was returned to phase separator B3. The vapor was then carried via conduit 12 to a position upstream of condenser C1. The liquid, with a water content of 0.02% by weight, left phase separator B3 via conduit 13, and was split into a surplus portion evacuated at a flowrate of 21 kg/h from the process, and a portion which was carried via conduit 15 at a flowrate of 520 kg/h to evaporator E4, power 70 kW. This portion left evaporator E4 completely vaporized at a temperature of 150° C. and entered reservoir B1 via conduit 16.

The process carried out in this example regenerated the desiccant (TEG) to a residual water content of less than 50 ppm. In addition, the residual water content of the stripping agent had been divided by eight simply by heating, evaporating less than a quarter of the stripping agent in exchanger E3 even though water is a much heavier substance than the stripping agent which is mainly composed of benzene.

We claim:

1. A liquid desiccant regeneration process using a stripping agent, wherein the stripping agent is liquid at ambient temperature and pressure, and forms a heteroazeotrope with water; and the process comprises:

(a) distilling a water laden liquid desiccant in a distillation zone comprising at least one rectification stage to produce an overhead vapor and a partially regenerated liquid desiccant;

(b) reboiling in a reboil zone said partially regenerated liquid desiccant to provide a vapor phase and residual partially regenerated liquid desiccant;

(c) stripping in a stripping zone the residual partially regenerated liquid desiccant from step (b), using vaporized stripping agent, to provide regenerated liquid desiccant;

(d) condensing the overhead vapor exiting distillation step (a), the condensation producing two liquid phases, a water-rich liquid phase and a stripping agent-rich liquid phase;

(e) heating the stripping agent-rich liquid phase from step (d) to generate a vapor phase richer in water than said liquid phase and a water-depleted liquid stripping agent phase; and (f) vaporizing at least a portion of resultant water-depleted liquid stripping agent phase from step (e) said portion being substantially sufficient to maintain a constant flow rate of vaporized stripping agent in step (c);

(g) utilizing resultant vaporized water-depleted stripping agent from step (f) in step (c); and (h) collecting the regenerated liquid desiccant from step (c) in a reservoir.

2. A process according to claim 1, wherein the vapor phase generated during step (e) is returned to a position upstream of step (d).

3. A process according to claim 1, wherein a portion of the stripping agent-rich liquid phase exiting step (d) is returned to step (a) and placed in contact with the distillation vapor.

4. A process according to claim 3, wherein the temperature in the reboiling step (b) is between 50° and 250° C.

5. A process according to claim 3, wherein the absolute pressure in the distillation zone, the reboil zone, the stripping zone and the reservoir is between 0.5 and 2 bar.

6. A process according to claim 3, wherein a fixed portion of water-depleted liquid stripping agent phase from step (e) is vaporized in step (f) and evacuating any excess water-depleted liquid stripping agent from the process.

7. A process according to claim 1, wherein the water depleted liquid stripping agent exiting step (e) is vaporized before being transported to stripping step (c).

8. A process according to claim 1, wherein the water depleted liquid stripping agent phase exiting step (e) is transported in liquid form towards stripping step (c) and vaporized during the course thereof, and the resultant vaporized form is employed as the stripping agent.

9. A process according to claim 1, wherein steps (a) and (c) are carried out in separate apparatus.

10. A process according to claim 1, wherein steps (a) and (c) are carried out simultaneously in the same apparatus, the water, depleted liquid stripping agent phase from the heating step (e) being transported towards the reboil zone of step (b).

11. A process according to claim 10, wherein the water-depleted stripping agent phase from the heating step (e) is introduced into the reboil zone in liquid form and is vaporized therein.

12. A process according to claim 10, wherein the water-depleted stripping agent phase is vaporized before introduction into the reboil zone.

13. A process according to claim 1, wherein the liquid desiccant is a glycol.

14. A process according to claim 13, wherein the glycol is triethylene glycol.

15. A process according to claim 1, wherein the stripping agent is a mixture of hydrocarbons.

16. A process according to claim 15, wherein the stripping agent comprises a major amount of benzene.

17. A process according to claim 1, wherein the temperature in the reboiling step (b) is between 150° and 250° C.

18. A process according to claim 1, wherein the absolute pressure in the distillation zone, the reboil zone, the stripping zone and the reservoir is between 0.5 and 2 bar.

19. A process according to claim 1, wherein a fixed portion of water-depleted liquid stripping agent phase from step (e) is vaporized in step (f) and evacuating any excess water-depleted liquid stripping agent from the process.

* * * * *